United States Patent [19]
Goerg

[11] Patent Number: 5,837,018
[45] Date of Patent: Nov. 17, 1998

[54] OIL MIST SEPARATING ELEMENT

[75] Inventor: Guenther Goerg, Moeglingen, Germany

[73] Assignee: Filterwerk Mann & Hummel GmbH, Ludwigsburg, Germany

[21] Appl. No.: 845,791

[22] Filed: Apr. 25, 1997

[30] Foreign Application Priority Data

May 8, 1996 [DE] Germany .................. 196 18 413.4

[51] Int. Cl.$^6$ ...................... B01D 39/12; B01D 46/00
[52] U.S. Cl. ...................... 55/385.3; 55/487; 55/525; 55/527; 55/DIG. 19; 55/DIG. 43; 55/DIG. 45
[58] Field of Search ............... 55/529, 527, 528, 55/521, 520, 486, 487, 488, 489, 497, 498, 358.3, DIG. 43, DIG. 45, DIG. 19

[56] References Cited

U.S. PATENT DOCUMENTS

| | | | |
|---|---|---|---|
| 1,912,235 | 5/1933 | Winslow | 55/487 |
| 2,187,264 | 1/1940 | Carlson | 55/525 |
| 2,230,278 | 2/1941 | Walton | 55/487 |
| 2,237,184 | 8/1941 | Goodloe | 55/525 |
| 2,274,684 | 3/1942 | Goodloe | 55/525 |
| 2,289,554 | 7/1942 | Root | 55/DIG. 19 |
| 2,334,263 | 11/1943 | Hartwell | 55/525 |
| 2,382,560 | 8/1945 | Goodloe | 55/DIG. 43 |
| 2,391,208 | 12/1945 | Walton | 55/487 |
| 2,532,888 | 12/1950 | Brown | 55/DIG. 19 |
| 2,683,500 | 7/1954 | Goodloe | 55/527 |
| 3,085,381 | 4/1963 | Sobeck | 55/489 |
| 3,470,689 | 10/1969 | Gurr | 55/DIG. 19 |
| 3,733,792 | 5/1973 | Taylor | 55/525 |
| 3,765,386 | 10/1973 | Ottofly | 55/486 |
| 3,780,872 | 12/1973 | Pall | 55/525 |
| 4,602,595 | 7/1986 | Aoki et al. | 55/DIG. 19 |
| 4,653,457 | 3/1987 | Stege | 55/DIG. 19 |
| 5,039,323 | 8/1991 | Ulitsky et al. | 55/527 |

OTHER PUBLICATIONS

Brochure of the Buck Company of Bondorf, Germany, no date.

"75 Jahre Textilforschung," (75 years of Textile Research) p. 66, Institut fuer Textil–und Verfahrenstechnik (Institute for Textile and Process Technology) Denkenforf, Germany, no date.

*Primary Examiner*—Duane S. Smith
*Attorney, Agent, or Firm*—Evenson, McKeown, Edwards & Lenahan, P.L.L.C.

[57] ABSTRACT

An oil mist separating element composed of a web of material formed of threads, yarns, wires or a combination thereof, the material of the oil mist separating element being formed at least partially, or entirely, of a mesh, raschel, knit or woven fabric.

20 Claims, 4 Drawing Sheets

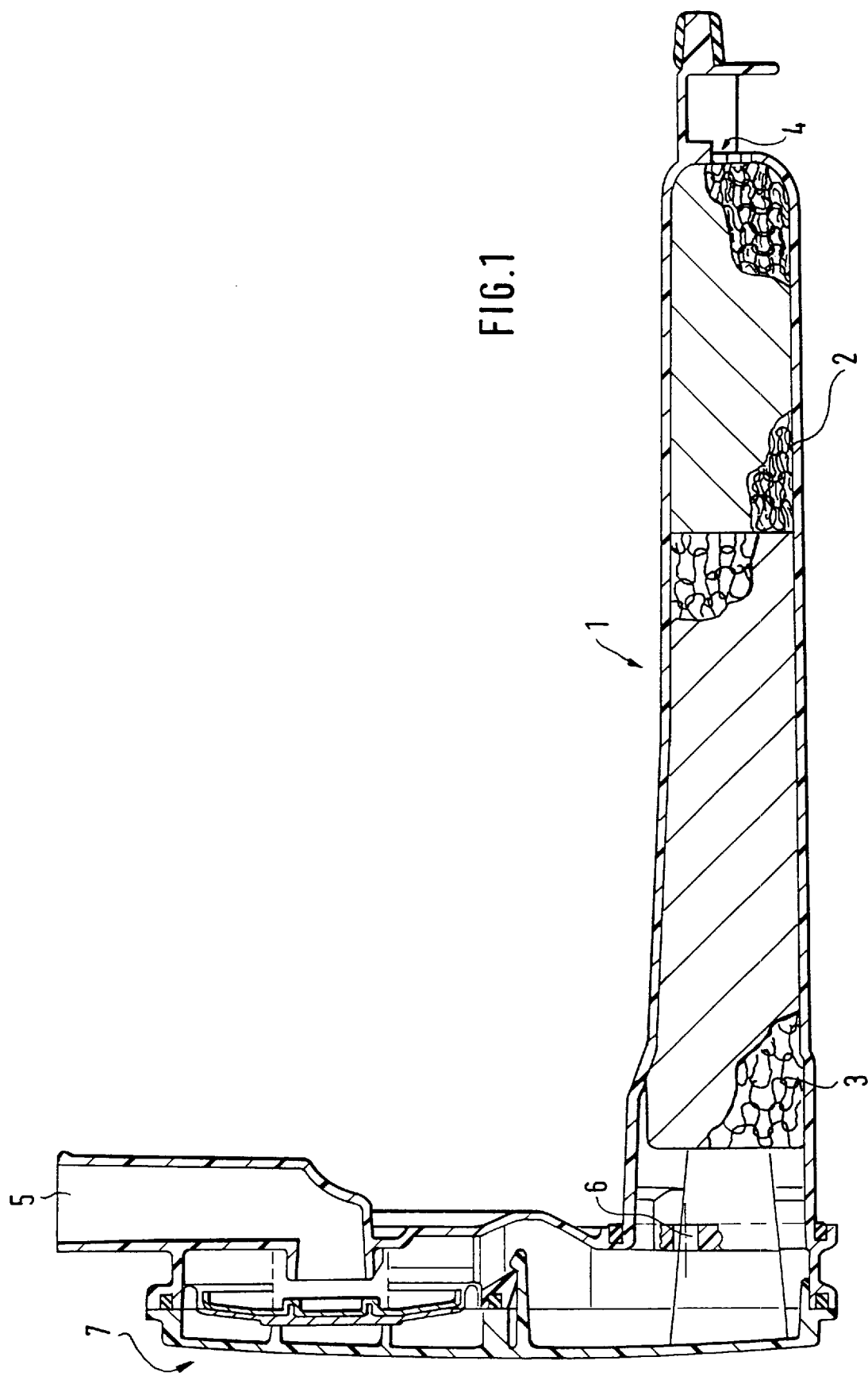

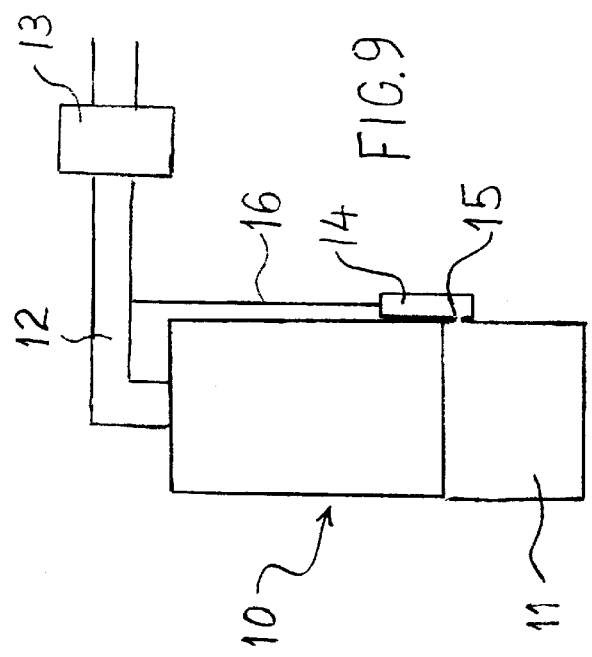
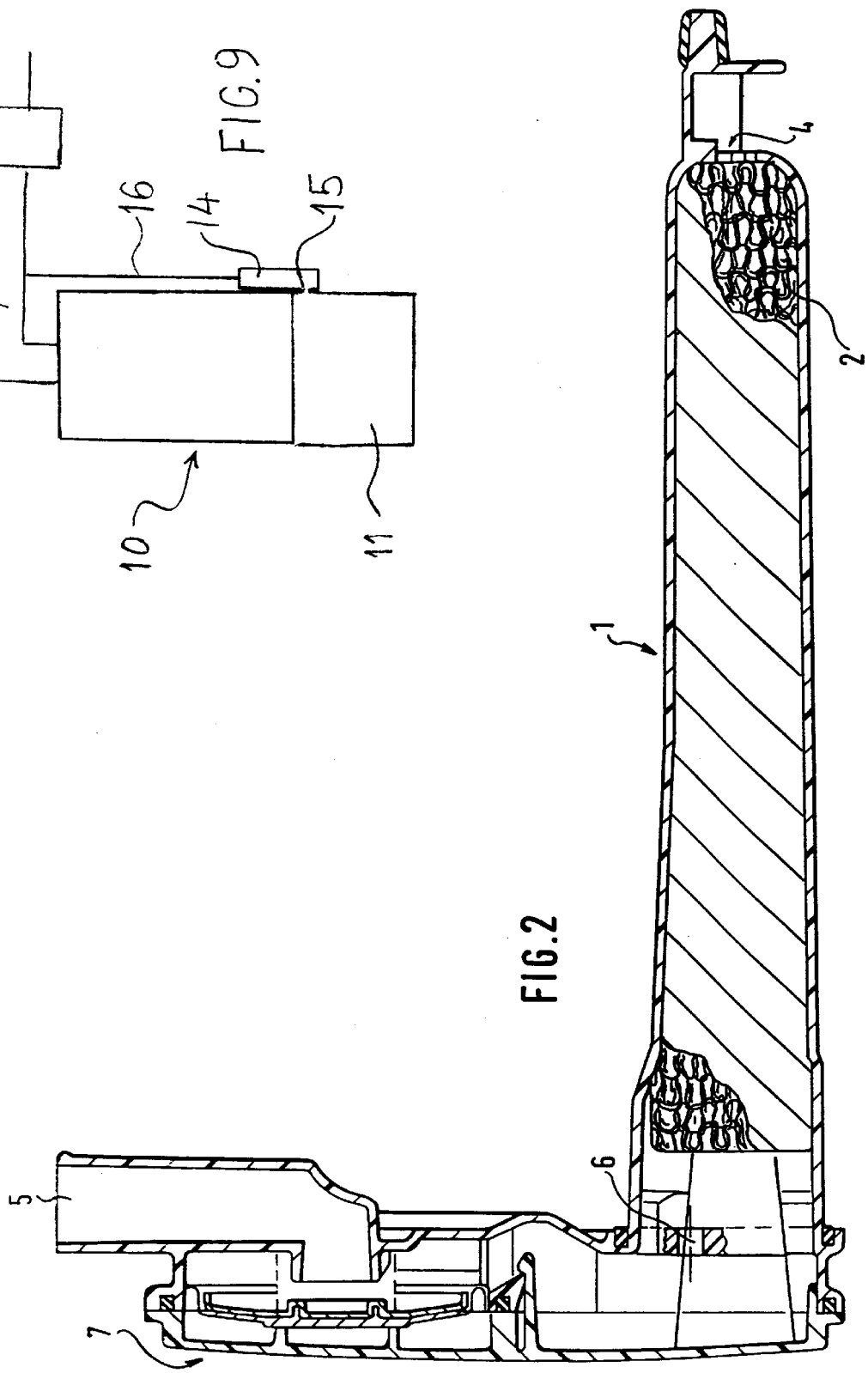

OIL MIST SEPARATING ELEMENT

BACKGROUND OF THE INVENTION

The present invention relates to an oil mist separating element. Such oil mist separating elements are known and used, for example, in internal combustion engines. If it is desired to use such oil mist separating elements, for example, in internal combustion engines which must satisfy recent emission regulations, it is a disadvantage that the degree of separation they achieve due solely to changes of direction, is inadequate.

It would be possible, for example, to provide for the additional use of a batting, but this would involve an unacceptably high increase in the pressure drop, especially when the element is clogged with dirt. Thus a frequent replacement of the element would be necessary, which would be impractical and expensive.

Similarly, knitted water filters composed of activated carbon fibers, as well as knits of ceramic fibers, for filter systems of Diesel engines are disclosed in a brochure of the Buck Company of Bondorf, Germany. Also known is the use of textured yarns in the field of carpet manufacture, as described in the publication, "75 Jahre Textilforschung," ("75 Years of Textile Research") p. 66, published by the Institut für Textil-und Verfahrenstechnik (Institute for Textile and Process Technology) of Denkendorf, Germany.

SUMMARY OF THE INVENTION

It is an object of the present invention to provide an improved oil mist separating element.

Another object of the invention is to provide an apparatus for separating an oil mist comprising improved oil mist separating elements.

A further object of the invention is to provide an oil mist separating element which will operate reliably for over an extended service life without requiring replacement.

These and other objects of the invention are achieved in accordance with the present invention by providing an oil mist separating element comprising a web of material formed of fibers, yarns, wires or a combination thereof, wherein the material is formed at least partially of a mesh, raschel, knit or woven fabric.

The oil mist separating element of the invention comprises a web material formed of threads, yarns, wires or a combination thereof, wherein the material of the oil mist separating element is composed at least partially, or completely, of a mesh, raschel, knit or woven fabric. The use of a mesh or net, raschel, knit or woven material provides for a low pressure loss and protects against undesirable clogging with contaminants.

In one advantageous embodiment of the invention, the material of the oil mist separating element comprises at least one coarse portion. This coarse part or portion acts as a supporting matrix for the separating element and simultaneously serves the function of separation and drainage, for example, for large oil particles.

In another advantageous embodiment, the material of the oil mist separating element comprises at least one fine portion. This fine part or portion serves for oil separation for a range of smaller oil particles.

In accordance with a preferred embodiment, the fine portion comprises a textured filament yarn. The combination of the properties of small filament diameter and high volume in the textured yarn yields good results in the separation of oil, for example in the aerosol range. This is advantageous because, particularly in engines which must satisfy ever increasing pollutant emission standards, it is important to achieve a high degree of oil separation combined with low pressure loss and prevention of clogging by carbon particles.

In another advantageous embodiment, the fine portion of the oil separating element comprises individual fibers that are smaller than 10 μm in diameter. At this order of magnitude, the separation of oil from aerosols is especially effective.

In another advantageous embodiment, the oil mist separating element can be produced in especially compact forms of tubular cross section by winding or folding. Due to the inherent stability of such mesh, raschel, knit or woven fabrics, it is possible to utilize the self-supporting properties of such materials and thereby avoid the need for an additional supporting envelope or wrapper.

In another advantageous embodiment, the oil mist separating element can be made by pressing or compressing the fabric into especially compact tubular cross-sectional forms. Pressing the products permits a reduction of the external dimensions combined with a simultaneous improvement of the specific surface area per unit of volume, which increases the degree of separation.

Another advantageous embodiment of the invention provides an oil mist separating element for use in an oil mist separator. This makes it clear that such oil mist separating elements can be used universally, e.g., in tubular cross sections etc.

In another advantageous embodiment of the invention, the oil mist separator is used in particular in the intake tract of an internal combustion engine. The use of such a device, especially in the air intake tract of an internal combustion engine, is of a precautionary character both in regard to emissions and to cleanliness within the engine, especially in view of the service life of working components, such as a turbocharger, an oil cooler and/or other such parts.

In a further advantageous embodiment of the invention, the oil mist separator can be used to remove oil from the blow-by gases in an internal combustion engine. In Diesel engines, for example, especially those with turbochargers, it is important to prevent oily gases from impinging on both the turbine buckets and the other working elements, so as to prevent contamination by pollutants as well as other damage to the parts of the apparatus.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference illustrative preferred embodiments shown in the accompanying drawings in which:

FIG. 1 is a sectional view an apparatus for separating an oil mist according to the present invention;

FIG. 2 is a sectional view through another apparatus for separating an oil mist according to the invention;

FIG. 9 is a schematic illustration of an oil mist separating apparatus according to the invention in communication between the crankcase and the intake tract of an internal combustion engine.

DETAILED DESCRIPTION OF PREFERRED EMBODIMENTS

Figure 3:
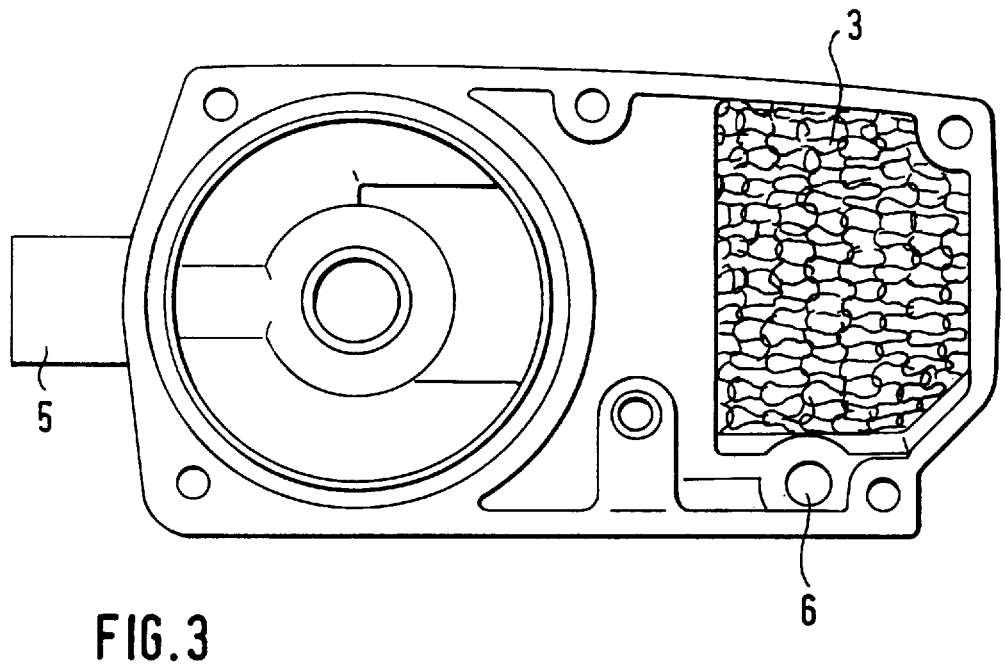
FIG. 3 is an end elevational view of the oil mist separating apparatus of FIG. 1.

FIG. 1 shows an oil separating device 1 comprising a housing containing an oil mist separating element according to the invention. The housing of the oil separating device has a gas inlet opening 4 and a gas outlet opening 5.

As shown in FIG. 1, the gas inlet opening adjoins an oil mist separating element, which in this embodiment comprises a wire mesh which additionally serves the supportive function of the oil mist separating element. To this wire mesh there is added a fine, textured filament or fiber 2 which can be seen more clearly in FIG. 6, and which constitutes the fine portion 2 of the oil separating element.

Directly adjoining the above-described oil mist separating element is an additional separating element which is formed only of a wire mesh, which here is shown as a coarse material and is intended for the removal of large droplets and additionally carries out a certain drainage function.

The oil separating element is followed in the housing by an oil return opening 6 which, after the oily gas has passed a sufficient distance through the oil mist separating elements, returns the separated oil to the oil circuit of the internal combustion engine. The arrangement of the oil return opening 6 is shown in FIG. 1 and in FIG. 3.

The oil separating device 1 further comprises a pressure regulating valve 7 in order to maintain required pressure conditions in the crankcase vent area.

Figure 4:
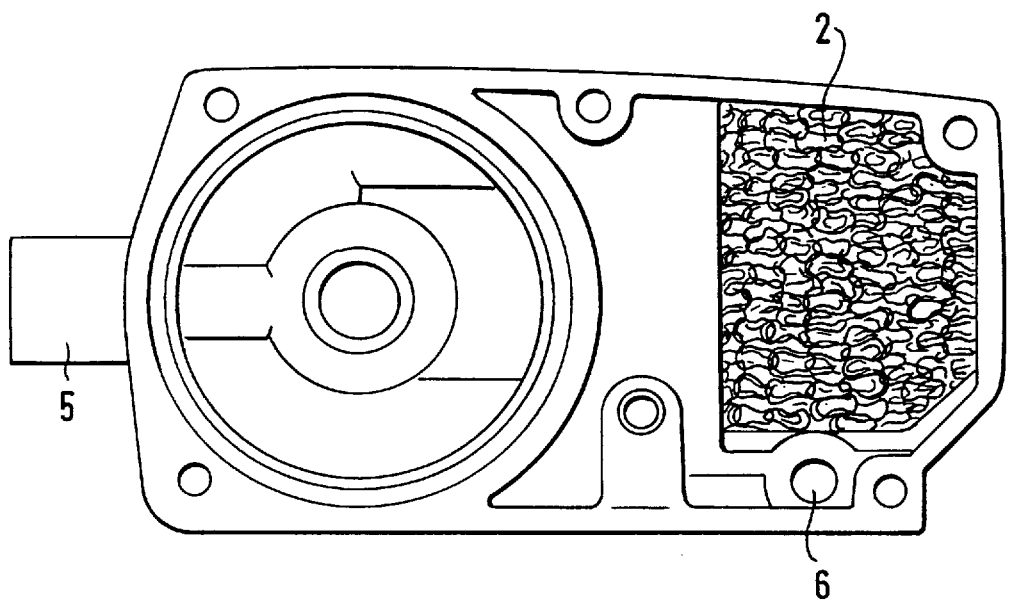
FIG. 4 is an end elevational view of the oil mist separating apparatus of FIG. 2.

In an alternative embodiment illustrated in FIGS. 2 and 4, the oil separating device 1 comprises a housing which contains the oil mist separating element. The housing of the oil separating device has a gas inlet opening 4 and a gas outlet opening 5.

As can be seen in FIG. 2, the gas inlet opening is adjoined by an oil mist separating element, which in this embodiment consists of a knit wire mesh which serves to support the oil filter element and at the same time serves as the coarse portion 3 of the oil mist separating element. To this knit wire mesh is added a fine, textured fiber or filament 2, more clearly seen in FIG. 6, which in this embodiment constitutes the fine portion 2 of the oil mist separating element.

At the end of the oil mist separating element the oil mist separating device has an oil return opening 6, through which, after the oily gas has passed through a sufficient length of the oil mist separating elements, separated oil is returned to the oil circuit of the internal combustion engine; the location of the return opening being shown in FIG. 2 and FIG. 4.

This embodiment also comprises a pressure regulating valve 7 for maintaining set pressure conditions in the area of the crankcase vent.

Of course, it is also possible to provide an oil mist separating element formed entirely of self-supporting fine filaments or fibers 2.

Figure 5:
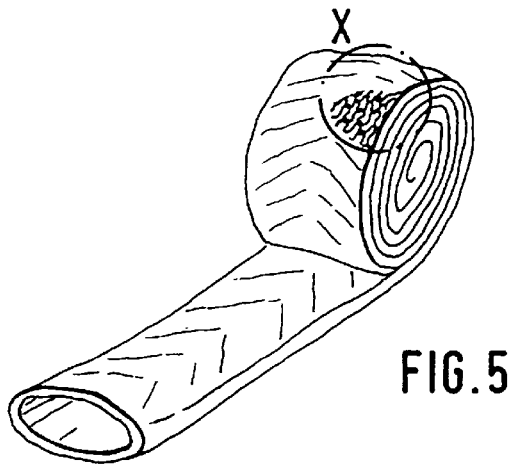
FIG. 5 shows a rolled oil separating element.
Figure 8:
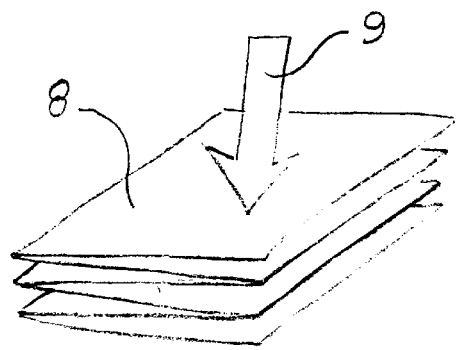
FIG. 8 shows a folded oil separating element.

FIG. 5 shows an oil mist separating element rolled into a compact form. In this compact form, the separating element can be inserted, for example, into the tubular cross sections of, for example, crankcase vents. Alternatively, it is likewise possible to fold the oil mist separating element in order thus to give it a similarly compact form, as represented in FIG. 8.

If desired, a folded or a rolled oil mist separating element as shown in FIG. 5, can be additionally pressed or compressed in a press in order thus to produce even more compact oil mist separating elements, which then can be installed in tubular cross sections of crankcase vents.

Figure 6:
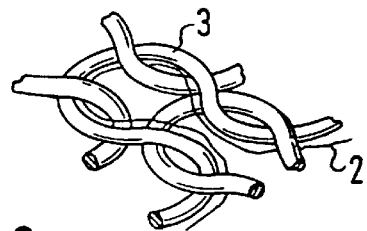
FIG. 6 is an enlarged sectional view of the area X of FIG. 5.
Figure 7:
FIG. 7 is an illustration of a textured fiber from FIG. 6.

FIG. 6 is an enlarged view of the detail area X of FIG. 5. In FIG. 6 it can be seen that the oil mist separating element is composed of a coarse part 3, which in this specific application consists of wire knit mesh, and a fine part 2 which in this case is composed of textured filament yarn, as illustrated in FIG. 7. As shown in FIG. 6, the strands of the fine portion 2 are interknitted or interwoven with the strands of the coarse portion 3 such that the fine strands 2 run parallel to the coarse strands 3.

The filaments, fibers or yarns used in the fine part may be selected to have electrostatic properties. The filaments, fibers or yarns may also be individually selected to have hydrophilic and/or hydrophobic character, that is to say, hydrophilic, hydrophobic or a mixture of hydrophilic and hydrophobic fibers or yarns may be used.

In FIG. 7 it can be seen how the very elastic yarn is given a great bulk by the texturizing, which due to the fineness of the yarn results in an enhanced performance in separating an oily gas stream.

FIG. 8 depicts a folded oil separating element 8 according to the invention composed of a fabric of coarse wire mesh with interspersed fine fibers. If desired, the separating element can be compressed as indicated by the arrow 9 to increase the density of distribution of the wires and fibers in the material. By appropriate folding and compression, the separating element can be fitted to any size or shape of container or passageway to effectively separate an entrained oil mist from a gas passed therethrough.

FIG. 9 is a schematic illustration of an oil separating device according to the invention intended to separate an entrained oil mist from blow-by gases. An internal combustion engine generally designated by reference numeral 10 has a crankcase 11. Air for the operation of engine 10 passes to the engine through an intake tract or manifold 12. A filter 13 is provided on intake tract 12 to filter incoming air. Blow-by gases from crankcase 11 pass into an oil separating device 14 according to the invention through an aperture 15. For clarity of illustration, the oil separating elements in the oil separating device 14 are not shown in the drawing, but it should be understood that they correspond to the elements 2 and 3 illustrated in the other drawing figures. Oil mist droplets entrained in the blow-by gases are separated in the oil separating device, from whence they flow back into the crankcase 11 of engine 10. After being freed from entrained oil, the blow-by gases then are aspirated through a tube 16 into the intake tract 12.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An oil mist separating element comprising a web of material formed at least partially of a mesh, raschel, knit or woven fabric, said web of material including a coarse portion with a plurality of coarse strands and a fine portion with a plurality of fine strands, said coarse and fine strands comprising fibers, yarns, or wires, said fine strands being interknitted or interwoven with said coarse strands over at least a portion of the seperating element such that said fine strands run parallel to said coarse strands.

2. An oil mist separating element according to claim 1, wherein the material of the oil mist separating element is formed completely of mesh, raschel, knit or woven material.

3. An oil mist separating element according to claim 1, wherein said fine portion comprises a textured filament yarn.

4. An oil mist separating element according to claim 1, wherein said fine portion comprises individual fibers which are smaller than 10 $\mu$m in diameter.

5. An oil mist separating element according to claim 1, wherein the oil mist separating element comprises a wound or folded web of material.

6. An oil mist separating element according to claim 5, wherein said web of material is wound or folded into a compact shape corresponding to the cross-section of a tube into which the separating element is inserted.

7. An oil mist separating element according to claim 1, wherein the oil mist separating element comprises a web of material pressed into a compact shape corresponding to the cross-section of a tube into which the separating element is inserted.

8. An apparatus for separating an oil mist, said apparatus comprising a housing having a gas inlet, a gas outlet, and an oil return opening; said housing containing at least one oil mist separating element according to claim 1.

9. An apparatus according to claim 8, wherein said housing is arranged in communication with an air intake tract of an internal combustion engine.

10. An apparatus according to claim 11, wherein the gas inlet of said housing communicates with a source of blow-by gases of the internal combustion engine, whereby said oil mist separating element separates oil entrained in said blow-by gases.

11. An oil mist separating element comprising:
   a coarse portion including a plurality of coarse strands; and
   a fine portion including a plurality of fine strands, said fine strands being interwoven or interknitted with said coarse strands over at least a portion of said element.

12. An oil mist separating element according to claim 13, wherein said fine strands are interwoven or interknitted with said coarse strands such that each one of the fine strands extends adjacent to a corresponding one of the coarse strands.

13. An oil mist separating element according to claim 12, wherein said each one of the fine strands and said corresponding one of the coarse strands are interlaced with an identical adjacent one of the coarse strands.

14. An oil mist separating element according to claim 11, wherein said fine strands are interwoven or interknitted with said coarse strands to form a mesh, raschel, knit or woven fabric.

15. An oil mist separating element according to claim 11, wherein said coarse portion consists of a wire mesh, and said fine portion consists of a textured filament yarn.

16. An apparatus for separating an oil mist in an internal combustion engine, said apparatus comprising:
   a housing having a gas inlet communicated with a crankcase of the internal combustion engine, a gas outlet communicated with an air intake tract of-the internal combustion engine, and an oil return opening; and
   at least one oil mist separating element arranged in said housing, said separating element including a coarse portion including a plurality of coarse strands, and a fine portion including a plurality of fine strands, said fine strands being interwoven or interknitted with said coarse strands over at least a portion of said element.

17. An apparatus according to claim 16, wherein said fine strands are interwoven or interknitted with said coarse strands such that each one of the fine strands extends adjacent to a corresponding one of the coarse strands.

18. An apparatus according to claim 17, wherein said each one of the fine strands and said corresponding one of the coarse strands are interlaced with an identical adjacent one of the coarse strands.

19. An apparatus according to claim 16, wherein said fine strands are interwoven or interknitted with said coarse strands to form a mesh, raschel, knit or woven fabric.

20. An apparatus according to claim 16, wherein said coarse portion consists of a wire mesh, and said fine portion consists of a textured filament yarn.

* * * * *